July 14, 1942.  R. MAYNE  2,290,109
FLEXIBLE TRACK
Filed Nov. 21, 1939
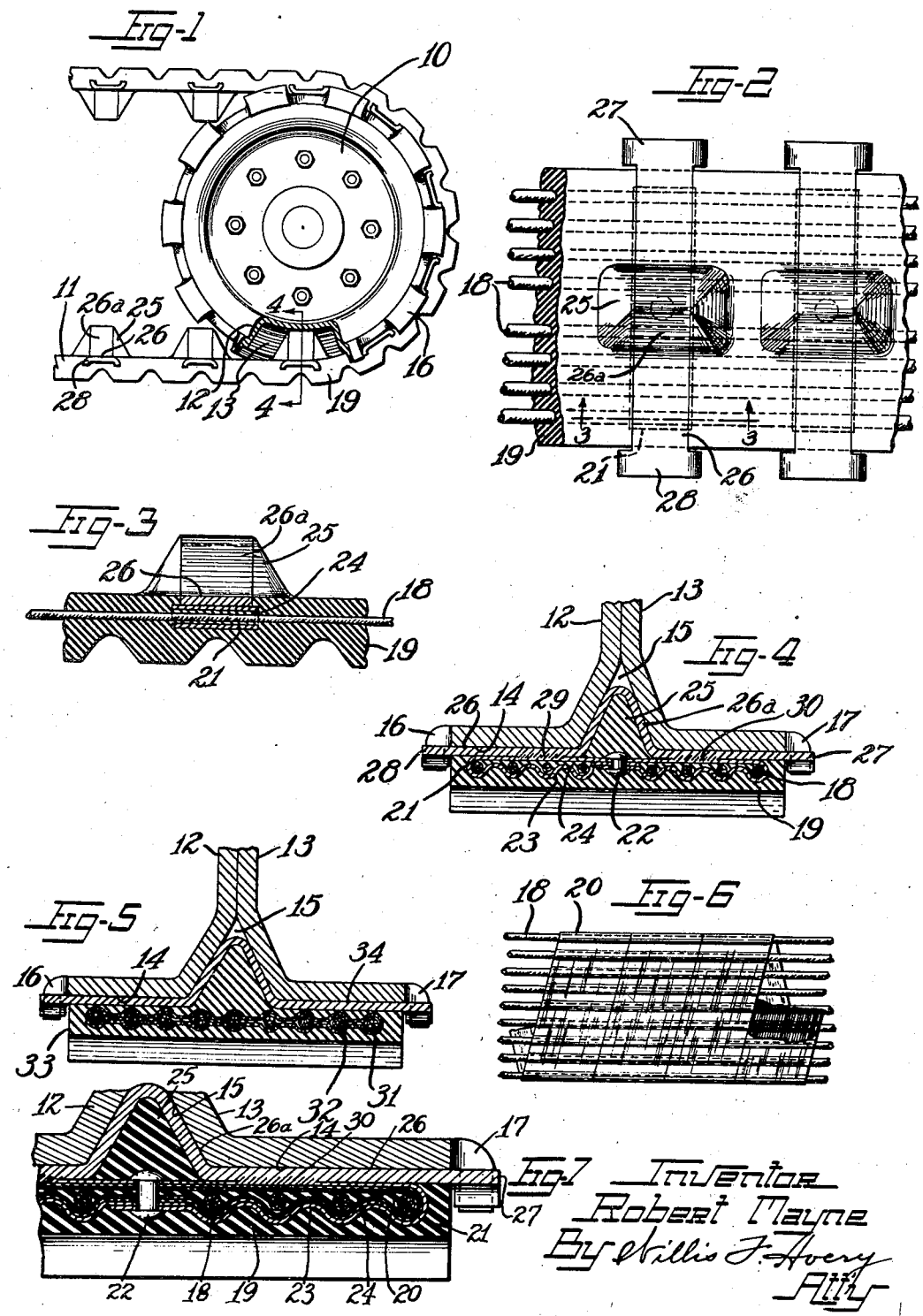

Patented July 14, 1942

2,290,109

UNITED STATES PATENT OFFICE 2,290,109

FLEXIBLE TRACK

Robert Mayne, Akron, Ohio, assignor to The B. F. Goodrich Company, New York, N. Y., a corporation of New York Application November 21, 1939, Serial No. 305,492

8 Claims. (Cl. 305—10)

This invention relates to flexible tracks for tractors and other vehicles of the self-laying track type.

In the self-laying track type of tractor endless track bands are trained about driving sprockets and guide pulleys so that a reach of the track extends under the pulleys between them and the ground and functions to support the tractor and to transmit the driving forces to the ground. As flexibility of support must be provided and the sprockets are of relatively coarse pitch and not always accurately machined, contact of the sprocket teeth with the driving bars of the track is accompanied by shock and unequal loading, a condition which promotes localized strains in the track.

The principal object of the present invention is to distribute suddenly applied stresses along the tension members of the track and to cushion the members so as to prevent breakage of the members due to localized loading.

Further objects of the invention are to provide greater flexibility between the driving mechanism and the resilient tread, and to provide security of bonding of the parts to each other.

Still further objects are to reduce noise and corrosion, to provide improved cushioning of the vehicle, to more uniformly distribute the traction load, and to eliminate lateral deflection.

These and other objects will appear from the following description and the accompanying drawing.

Of the drawing

Fig. 1 is a side elevation of a part of the tractor track of this invention and one of the driving wheels with which it cooperates, other parts being broken away, part of the wheel being broken away to show the track.

Fig. 2 is a plan view of a section of the track of this invention in one of its forms, parts being broken away and parts shown in section.

Fig. 3 is a section taken along the line 3—3 of Fig. 2.

Fig. 4 is a cross-section of the track and wheel taken on line 4—4 of Fig. 1.

Fig. 5 is a view like Fig. 4 but showing a modified construction.

Fig. 6 is a plan view, with parts broken away, of the traction cables and their wrapping, of the construction of Fig. 5, before application of the rubber body.

Fig. 7 is a cross sectional view similar to Fig. 4 showing a further modification of the invention.

Referring to the drawing, the numeral 10 designates one of the driving wheels of a tractor or other vehicle of the self-laying track type about which the flexible track 11 is engaged. The wheel is formed of a pair of discs 12, 13 secured together to provide a track bearing face 14 of broad extent, a track-guiding groove 15 at its center, and sprocket teeth 16, 17 at its margins to engage the track in driving relation thereto.

In the form of my invention illustrated in Figs. 5 and 6, the track comprises a plurality of spaced convolutions of load transmitting cable 18 completely embedded in and enclosed by an endless tread band 19 of resilient wear-resisting rubber-like material such as vulcanized rubber composition or compositions of similar rubber-like materials such as polymerized vinyl chloride compositions and mixtures thereof, neoprene compositions, polymerized olefine polysulphide compositions, and polymers of butadiene, and the like, including mixtures thereof generally referred to herein as rubber-like materials. To distribute forces along the cables and to provide an effective bonding of the rubber-like materials to the cables which are generally of steel or other metal, and to effect accurate positioning thereof, a layer of rubberized fabric or cords 20 is wrapped about the spaced convolutions of cable, preferably by applying a tape-like band of cords as a helically disposed wrapping thereabout as shown in Fig. 6. The fabric or cord material adheres to the cable and is pressed together between the convolutions thereof so as to provide good contact about each convolution and to eliminate the presence of voids between the cables. The cables may be additionally prepared in any desired manner for bonding them to the rubber as by coatings of rubber adherent metal or cements applied thereto, although the wrapping of cords or fabric alone provides sufficient traction. The rubber-like material of the body or tread band 19 is molded about the cables and their cord or fabric wrappings and to driving bars 34 spaced therealong, the rubber-like material being bonded to the driving bars by vulcanization. In this form of the invention, maximum cushioning is attained between the cables and the driving bars together with positive driving and guiding of the track.

To provide additionally for distribution of forces and for positive spacing of the cable convolutions, and to provide for further securing the cables to driving means, metallic bands 21 may be clamped about the spaced convolutions at spaced positions along the cables, as shown in Fig. 7. These bands extend across the pulley engaging face of the cables and their cord wrappings and may have their ends folded inwardly about the group of cables and secured as by rivets 22, the ends preferably being corrugated as at 23 to provide half round grooves to receive and embrace each cable convolution to hold the convolutions in proper spaced relation.

If desired, the wrapping of cords 20 may be omitted as in Figs. 2 to 4 and the bands 21 alone employed for distribution of forces and for holding the cables in spaced relation. In either the construction of Fig. 4 or that of Fig. 7, the rubber-like material extends around each cable convolution within the corrugations of the bands as at 24 so as to cushion each cable convolution with respect to the metal band. The rubber tread 19 is applied about the cable convolutions and spacing bands so as completely to enclose the cable and to expose the flat portions of the spacing bands 21 at the wheel contacting face thereof. The bands 21 are equally spaced and correspond in spacing to the pitch of the driving teeth of the wheels. Over the center of each spacing band, the rubber-like material is formed to provide a guiding lug 25 integral with the tread. These lugs are of pyramidal shape to conform to the guiding groove 15 of the wheel.

To provide for driving the track a plurality of driving bars 26 corresponding usually in number to the bands 21 are provided. These bars have a hump 26a formed at their centers to span the lugs 25 and form a metal facing therefor. Their ends 27, 28, projecting beyond the rubber tread, are formed to engage the teeth of the wheel 10. Each driving bar 26 is secured to the exposed face of a band 21 as by welding 29, 30 or other fastening means.

The driving bars 26 may be welded to the bands 21 before these are secured about the cables, in which case the rubber composition may be molded about the metal parts with the upper surface and the ends of the bars exposed, the rubber-like material being preferably bonded to the metal bars by a vulcanized bond.

Variations may be made without departing from the scope of the invention as it is defined by the following claims.

I claim:

1. A self-laying track comprising a plurality of flexible metal tension members in parallel spaced-apart relation, a wrapping of rubberized textile material thereabout, a resilient body of rubber-like material completely enclosing the tension members and their wrapping of textile material, and a metal driving bar attached to said resilient body by a vulcanized bond.

2. A self-laying track comprising a flexible metal tension member, a helical winding of cord thereabout, a resilient body of rubber-like material completely enclosing said winding, and a metal driving bar attached to said body by a vulcanized bond.

3. A self-laying track comprising a plurality of flexible metal tension members in parallel spaced-apart relation, metal bands extending about the tension members at spaced intervals and separated therefrom by resilient rubber-like material, a resilient body of rubber-like material enclosing said tension members and said bands, and metal driving bars secured to said bands and extending beyond said resilient body.

4. A self-laying track comprising a plurality of flexible metal tension members in parallel spaced-apart relation, a wrapping of flexible binding material about said tension members, metal bands extending about the tension members at spaced intervals, a resilient body of rubber-like material enclosing said tension members and said bands, and metal driving bars secured to said bands and extending beyond said resilient body.

5. A self-laying track comprising a flexible metal tension member, a metal band clamped thereabout but separated from the tension member by a cushion of rubber-like material, a resilient body of rubber-like material partially enclosing said tension member and said band, and a metal driving bar secured to said band.

6. A self-laying track comprising a flexible metal tension member, a wrapping of flexible binding material about said tension member, a metal band clamped thereabout but separated from the tension member by a cushion of rubber-like material, a resilient body of rubber-like material partially enclosing said tension member and said band, and a metal driving bar secured to said band.

7. A flexible track comprising at least one flexible tension member, a body of resilient rubber-like material enclosing said member, drive-wheel engaging means extending laterally across an exposed face of said body and separated from said tension member by the resilient material of said body, and flexible stress-distributing means within said body adjacent said tension member and separated therefrom by said resilient material.

8. A flexible track comprising at least one flexible tension member, a body of resilient rubber-like material enclosing said member, drive-wheel engaging means extending laterally across an exposed face of said body and separated from said tension member by the resilient material of said body, and flexible stress-distributing means within said body adjacent said tension member and separated therefrom by said resilient material, said stress-distributing means comprising a band enclosing a portion of said tension member.

ROBERT MAYNE.